United States Patent [19]
Rosenberg

[11] 3,818,334
[45] June 18, 1974

[54] DETERMINING CUTTING TOOL FORCE BY MEASURING ELECTRICAL RESISTANCE OF A BEARING

[76] Inventor: Jack Rosenberg, 808 Bienveneda Ave., Pacific Palisades, Calif. 90272

[22] Filed: Apr. 11, 1973

[21] Appl. No.: 350,082

[52] U.S. Cl.................. 324/65 R, 73/78, 318/646, 318/650, 340/269
[51] Int. Cl............................................. G01r 27/02
[58] Field of Search................. 324/65 R; 340/269; 318/646, 650; 73/78, 104, 133, 136 R

[56] References Cited
UNITED STATES PATENTS

| | | | |
|---|---|---|---|
| 2,601,259 | 6/1952 | Busignies | 73/136 A |
| 2,808,563 | 10/1957 | Hornbostel | 324/65 R |
| 3,176,286 | 3/1965 | Dschen | 340/269 X |
| 3,196,346 | 7/1965 | Inoue | 324/65 R |
| 3,214,965 | 11/1965 | Wellborn | 73/78 |

FOREIGN PATENTS OR APPLICATIONS

| | | | |
|---|---|---|---|
| 195,179 | 10/1967 | U.S.S.R. | 324/65 R |

*Primary Examiner*—Stanley T. Krawczewicz
*Attorney, Agent, or Firm*—Lindenberg, Freilich & Wasserman

[57] ABSTRACT

The side thrust established when a cutting tool of a machine tool is moved into engagement with a work piece may be measured by measuring the resistance change which occurs across the bearings which support the rotating spindle in which the cutting tool is held, which resistance change is caused by the application of the side thrust. This resistance change in the form of a change in voltage can be used for adaptive control of a numerically controlled machine tool.

6 Claims, 2 Drawing Figures

DETERMINING CUTTING TOOL FORCE BY MEASURING ELECTRICAL RESISTANCE OF A BEARING

BACKGROUND OF THE INVENTION

This invention relates to machine tool systems, and more particularly, to improvements in the controls therefor.

In the operation of a machine tool, the cutting tool is applied to the surface of the workpiece. The cutting speed with which the machine tool can be operated is determined by a number of factors, including the hardness of the workpiece, together with the kind of tool being used. However, it is well recognized that if the tool is applied to the workpiece with too little force, the machining process takes longer than it should. By the same token, if the tool is applied to the workpiece with too large a force, then the tool or the workpiece may be damaged. In either case, the cost of the process increases.

In numerical control systems, the feedrate is determined in advance in order to try to take these factors into account. However, no simple apparatus has yet been proposed to determine whether or not a numerically controlled machine is actually being used efficiently, as far as the time required for machining a workpiece is concerned, or whether or not it is moving at the optimum metal removal feedrate.

OBJECTS AND SUMMARY OF THE INVENTION

An object of this invention is the provision of a simple and useful arrangement for measuring the side force applied to the cutting tool and spindle of a machine tool.

Another object of this invention is the provision of an arrangement for measuring the side force applied to the tool and spindle of a workpiece whereby, the efficiency of the use of said machine tool may be increased.

The foregoing and other objects of the invention may be achieved in an arrangement wherein an electrical current is caused to flow through the bearings of the spindle and the voltage drop across a fixed resistor is measured as the cutting tool held by the spindle engages a workpiece. The amplitude of this voltage is directly correlated with the side loading force on a spindle. That is, the lower the voltage drop, the greater the side loading force, and the greater the voltage drop, the lower the side loading force. In other words, the electrical resistance of the bearing, as indicated by the voltage drop across a fixed resistor, varies inversely with the side load applied to the spindle, as a result of the tool being engaged with the workpiece.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
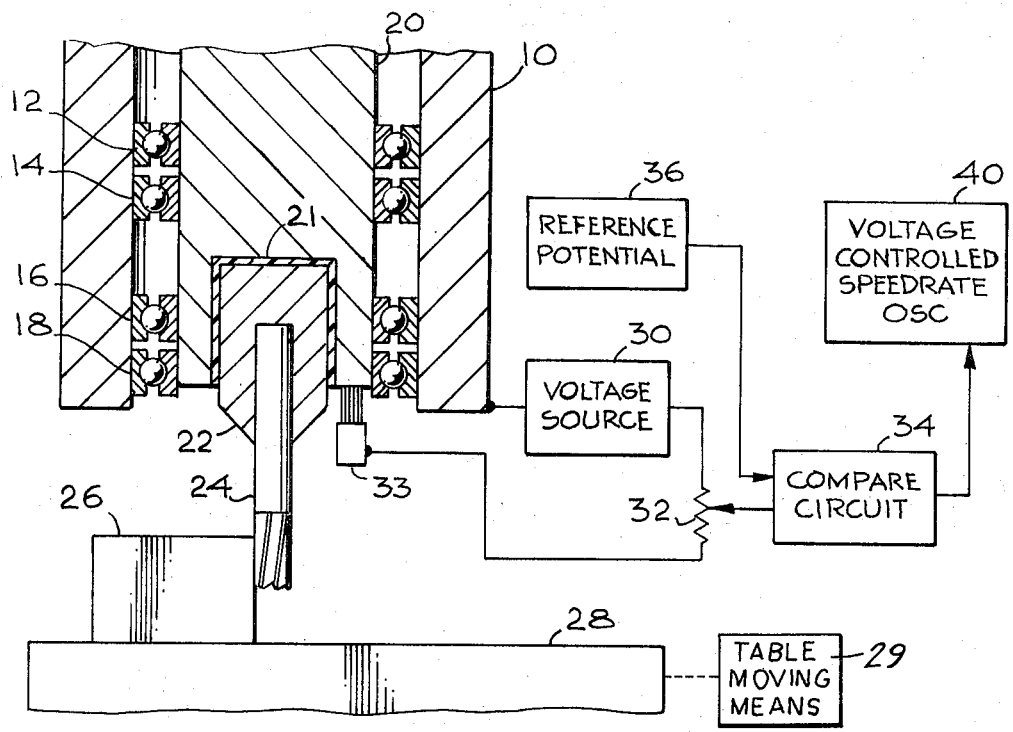
FIG. 1 is a schematic view of an embodiment of the invention.

Referring now to FIG. 1, there may be seen a schematic representation of an embodiment of the invention. There is schematically shown, and in cross section, the spindle housing 10 of a machine tool, (not shown) which encloses several sets of bearings exemplified by 12, 14, 16 and 18, which support the rotating spindle 20. The spindle holds a collet 22, which is used to hold a cutting tool 24. A pad of electrical insulating material 21 is inserted between collet and spindle to electrically insulate one from the other.

The cutting tool is urged against a workpiece 26, which is fastened to the top of a moving table 28. A table moving means 29 moves the table 28 along X, Y and Z axes, as directed.

It will be appreciated that what has been described thus far, except for the electrical insulating material 21, is a portion of a machine tool, which is well known in the art.

Rotary bearings such as ball, needle, and sleeve bearings, and linear bearings have an unusual electrical resistivity characteristic which is not generally known. When a ball bearing is at rest, so that the inner and outer races are not rotating with respect to each other, there is a very low electrical resistance between the inner and outer race. This is because the balls make good electrical contact with both races. As soon as relative rotation between the races is initiated, as for example, when the spindle 20 in FIG. 1 is turned on, the balls begin to roll on a film of lubricant which insulates them electrically from both races. So long as there is little lateral force on the combination of rotating bearings, 12, 14, 16 and 18, the resistance between the spindle 20 and housing 10 will be very high, typically in excess of 10,000 ohms.

As side force is applied, which is the case when the cutting tool 24 moves into the workpiece 26, the electrical resistance will decrease because the force reduces the thickness of the film of lubricant covering the balls in each bearing. The net electrical resistance between spindle 20 and housing 10 will be inversely proportional to the side force on the cutting tool 24, and for typical efficient cutting loads producing several hundred pounds of force the resistance will drop to 0.1 ohm or less. The resistance continues to drop as the force increases up to a level which will break the tool. This inverse relationship between electrical resistance and side force on the spindle is repeatable for a given set of spindle bearings, and predictable for different classes of bearings with given lubricants. For a particular set of bearings, the resistance at a fixed side load can be altered and controlled by installing different lubricants with desired viscosity and resistivity characteristics.

To minimize wear, a lubricant is always used in machinery, such as machine tools, when one member regularly moves with respect to another member. This is the case for rotary motion, for which ball bearings are usually employed, and also the case for linear motion. When a machine tool table slides in its ways, which are a linear bearing surface, there will be an appreciable electrical resistance between the table and its ways. At rest, the resistance will be very low, and when the table is in motion, the resistance will drop as vertical force on the table reduces the thickness of the lubricant separating the table from the ways. It is the absence of a film of lubricant when the table is not moving which causes a high force to be required to initiate motion of the table. This phenomenon causes the frictional characteristic known as "stick-slip"; the break-away friction is higher than the moving friction.

In accordance with this invention, a change in resistance of the spindle bearings between the rotating spindle and the spindle housing is detected by the expedient of connecting one terminal of a voltage source 30 to the spindle housing 10. The other terminal of the voltage source is connected across a resistor, which is here exemplified by a potentiometer 32. The other terminal of the potentiometer resistor is connected to a brush arrangement 33, for making a low resistance contact to the spindle 20. The brush arrangement may be, for example, a steel wire electrical brush or any other arrangement for making electrical contact.

A connection is made from the potentiometer to a comparing circuit 34, which may be for example, a differential amplifier. The potentiometer is set at a suitably selected level so that the comparing circuit can compare the potential derived from the potentiometer 32 with the potential derived from a reference potential source 36. The difference, as determined by the comparing circuit 34, can constitute an error voltage. If the reference potential is established at a value, for example, indicative of what the side thrust or load on the spindle should be when the cutting tool is in engagement with the workpiece at a particular feedrate, then, the error potential output from the comparing circuit 34 indicates a departure from this load. If the departure, as indicated by the error voltage is one wherein the load measured is too great, then the error voltage can be used to reduce the feedrate, or the velocity of the machine tool table, until the thrust of the workpiece against the cutting tool is reduced. If the error voltage indicates that the side thrust or load against the bearings is lower than what is represented by the reference potential, then the feedrate can be increased in response to the error voltage, so that the workpiece is pressing harder against the cutting tool.

Instead of a fixed reference potential, a variable reference potential may be employed. This can be done by programming the reference potential for the different feedrates which are being used for different types of cuts. The programmed reference potential may be programmed on the punched paper tape or on the magnetic tape, which is usually used for providing signals which control the operation of the numerical control system. If desired, both reference potential and error potential may be digitized for the purpose of using a digital control system. The control of the feedrate may be achieved, for example, by applying the output of the comparator circuit 34 to a voltage controlled feedrate oscillator 40. This is the oscillator whose output is used for driving the rate multiplier circuits from which the feedrate for a numerical control system may be derived.

It should be noted that the potential which exists at the output of the potentiometer varies with the side loading on the bearings, and thus, can provide a direct indication of the side thrust force applied against the cutting tool by the workpiece. If desired, this may be observed directly using a meter.

Figure 2:
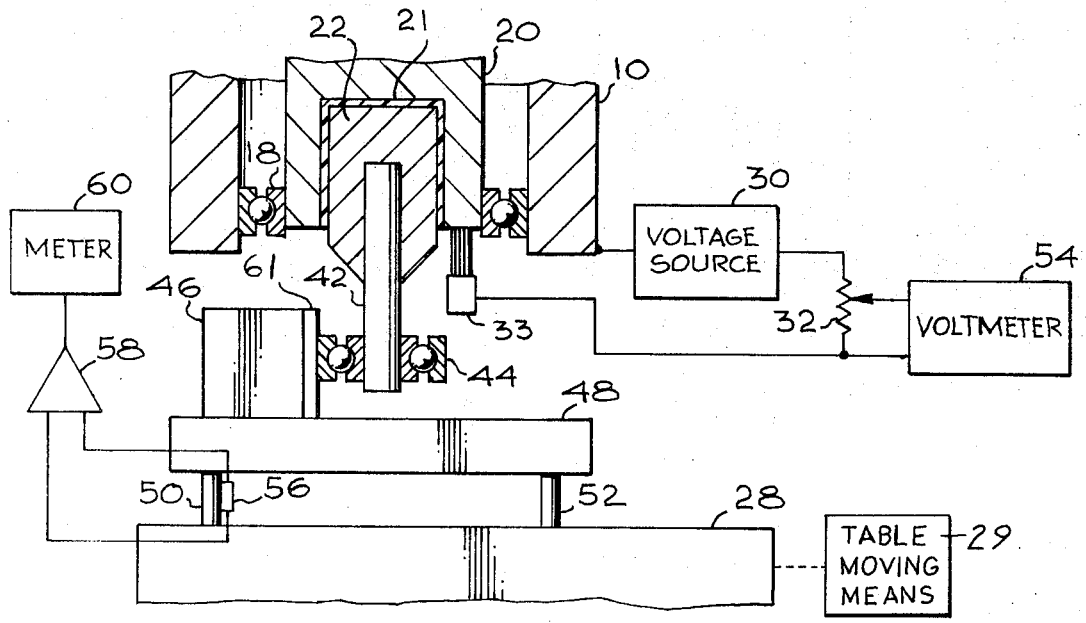
FIG. 2 is a schematic view of an embodiment of the invention illustrating how it may be calibrated.

FIG. 2 illustrates an arrangement whereby the values for the reference potential, or a determination of the potential for a particular side thrust or load value may be derived. Structure which performs the same function as the structure shown in FIG. 1, has similar reference numerals applied thereto. Instead of a cutting tool, a drill rod 42 is employed. The drill rod is held in the chuck 22 similarly to the manner in which the cutting tool is held. At one end of the drill rod, a bearing 44 is mounted. A metal structure 46, for example, is attached solidly, to a table 48. The table is mounted on legs, illustrated by numerals 50 and 52, on top of the moving table 28 of the machine tool.

Instead of a comparing circuit 34, a voltmeter 54 is connected to the potentiometer 32. A strain gage 56, is attached to one of the legs 50. It measures the strain experienced in one of the directions of motion of the machine tool table, for example, motion along the X axis. Typically, the strain gage 56 is connected to an amplifier 58. The output of the amplifier is connected to a meter 60, which indicates the amount of the strain.

Between the block of metal 46 and the bearing 44, there is inserted an insulating pad 61 to reduce vibrations.

When the machine tool table 28 moves so that the block of metal 46 and the pad 61 bring side pressure against the bearing 44, the resistance change in the bearings which support the rotating spindle, is indicated by the voltmeter 54. That is, the voltmeter indicates voltage readings showing the resistance of the bearings decreasing with increasing side thrust of the block 46 against the drill rod 42. The meter 60 provides an indication of the force or thrust being applied against the drill rod. Therefore, the amplitude of a desired side thrust for a given machine can be represented by a voltage value, as indicated by the voltmeter 54. From the information thus obtained, values of the reference voltages are obtained, which are required to establish a desired side thrust when the machine is actually performing a cutting operation. Thus, with this invention, a numerically controlled machine tool may be operated at a predetermined and optimal cutting force.

The measurement of bearing electrical resistance, in accordance with this invention, has the following advantages over any other method of side force measurement.

1. It measures the composite or vector force directly. No additional vectorial computation is necessary.

2. No sensors have to be added to the machine tool or attached in any way. This avoids any mechanical changes, saves large amounts of money, and results in a measurement system with fewer electrical components and higher reliability. The Force Table normally employed costs about $5,000; the exciters and operational amplifiers cost about $2,000 additional. Costs of vectorial computation are not known, but appreciable.

3. The signal across the bearing is at a high power level, therefore electrical noise problems either are non-existent or are simple to eliminate by using a filter.

4. It represents by far the lowest total system cost known.

5. When Force Tables or other conventional transducer systems are used, they must have some mechanical compliance (or deflection) for the strain gages to generate even a small output signal. This compliance can introduce objectionable physical properties into the cutting process. The bearing resistance system introduces no physical changes in the operation of the machine tool.

While the embodiment of the invention which has been described measures the change in resistance of bearings in a rotating system, the same principles apply in systems where motion is linear. Also, where it may be desirable to measure forces applied to bearings over a very wide range with great linearity, it is possible to design bearings which provide desired electrical properties. It is also possible to provide bearing lubricants with desired electrical properties. Also, a thin annular ring of a material, such as graphite may be incorporated in the inner or outer race of the bearings without changing over-all dimension. The graphite material resistance is accurately proportional to pressure, and thus, is usable in the invention.

There has accordingly been described and shown a novel, simple and useful system for measuring the side thrust between a cutting tool and workpiece. While the description herein has been directed to such measurement using the bearings in the spindle, it will be apparent to those skilled in the art that the voltage drop or resistance existing across bearings at other locations, may also be used, such as the thrust bearing in the table moving apparatus. Thus, it is not intended that this invention be limited to measurements across the spindle bearings, although, this is the preferred embodiment. Neither is it intended that this invention be limited to machine tools which cut metal.

What is claimed is:

1. In a machine having a rotating means supported by bearings against which force is applied when said machine is required to do work, which force related to the force used in doing said work, means for measuring the force used in doing said work, comprising
    a source of current,
    means for causing current to flow from said source through said bearings, and
    means for detecting the voltage across said bearings established by the force applied against said rotating means when said machine is doing work whereby said voltage is an indication of the force used in said work.

2. In a machine as recited in claim 1 wherein there is included:
    means for establishing a signal representative of a desired force for doing said work,
    means for comparing said signal with the voltage detected across said bearings and producing a resultant signal, and
    means for controlling said machine responsive to said resultant signal for nullifying said resultant signal.

3. In a machine as recited in claim 1 wherein said machine is a machine tool,
    said bearings are in a spindle housing and hold a spindle,
    said spindle holds a collet which holds a tool,
    said machine tool has a table,
    a workpiece is mounted on said table,
    said table includes means for moving said table relative to said tool to cause said tool to engage said workpiece and apply force thereagainst.

4. In a machine tool having a spindle held by bearings in a spindle housing, said spindle having a collet which holds a tool, said machine tool having a table which supports a workpiece, said machine tool having means for moving said table relative to said tool to cause said tool to engage said workpiece; means for determining the side thrust force against said tool comprising:
    means for causing a current to flow through said bearings, and
    means for determining the voltage existing across said bearings as a result of said side thrust force whereby said voltage represents said side thrust force against said tool.

5. In a machine tool as recited in claim 4 wherein said means for causing a current to flow through said bearings includes:
    a source of potential having two output terminals,
    means for connecting one of said output terminals to said spindle housing, and
    means for connecting the other of said output terminals to said spindle.

6. In a machine tool having a spindle held by bearings in a spindle housing, said spindle having a collet which holds a tool, said machine tool having a table which supports a workpiece, said machine tool having means for moving said table relative to said tool to cause said tool to engage said workpiece; means for establishing a desired side thrust force against said tool comprising:

a resistor,
    means connecting said resistor to said bearings,
    means for causing a current to flow through said bearings and said resistor to establish a voltage drop across said resistor that varies as a function of the side thrust force on said bearings caused by the side thrust force against said tool,
    means for establishing a reference voltage representative of a desired side thrust force against said tool,
    means for comparing said voltage drop and said reference voltage to establish an error voltage as a result of said comparison, and
    means for utilizing said error voltage to control said means for moving said table relative to said tool to reduce said error voltage to a minimum value.

* * * * *